(12) United States Patent
Lingafelt et al.

(10) Patent No.: US 9,094,521 B2
(45) Date of Patent: *Jul. 28, 2015

(54) METHODS TO IMPROVE FRAUD DETECTION ON CONFERENCE CALLING SYSTEMS BASED ON OBSERVATION OF PARTICIPANTS' CALL TIME DURATIONS

(71) Applicant: International Business Machines Corporation, Armonk, NY (US)

(72) Inventors: Charles S. Lingafelt, Durham, NC (US); James W. Murray, Reasearch Triangle Park, NC (US); James T. Swantek, Canton, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/917,467

(22) Filed: Jun. 13, 2013

(65) Prior Publication Data

US 2013/0279679 A1 Oct. 24, 2013

Related U.S. Application Data

(63) Continuation of application No. 12/631,458, filed on Dec. 4, 2009, now Pat. No. 8,494,142.

(51) Int. Cl.
*H04M 3/42* (2006.01)
*H04M 3/56* (2006.01)
*H04M 3/38* (2006.01)
(Continued)

(52) U.S. Cl.
CPC ............. *H04M 3/56* (2013.01); *H04L 12/1822* (2013.01); *H04M 3/38* (2013.01); *H04L 12/1818* (2013.01); *H04L 12/585* (2013.01); *H04M 2201/12* (2013.01); *H04M 2201/18* (2013.01)

(58) Field of Classification Search
CPC .............................. H04M 3/56; H04L 12/1818
USPC ....................................................... 379/202.01
See application file for complete search history.

(56) References Cited

U.S. PATENT DOCUMENTS

| 5,555,551 A | 9/1996 | Rudokas et al. |
| 5,903,629 A | 5/1999 | Campbell, IV et al. |
| 5,907,602 A | 5/1999 | Peel et al. |

(Continued)

OTHER PUBLICATIONS

Neumann, Peter G., et al., "Risks to the Public in Computers and Related Systems" SRI International EL-243, p. 6-14.

(Continued)

*Primary Examiner* — Sonia Gay
(74) *Attorney, Agent, or Firm* — Cahn & Samuels, LLP

(57) ABSTRACT

An embodiment of the invention includes a method for detecting fraudulent use in a conference calling system. One or more time duration thresholds are received for a conference call. The conference call is monitored to determine an attendee duration, a participants duration, and/or a conference call duration. The attendee duration represents the call duration of an attendee of the conference call; the participants duration represents the total call duration of all of the attendees combined; and, the conference call duration represents the call duration of the conference call. The time duration thresholds are compared to the attendee duration, participants duration, and/or conference call duration. Actions are performed by a processor if the attendee duration, participants duration, and/or conference call duration exceeds the time duration thresholds.

22 Claims, 7 Drawing Sheets

(51) Int. Cl.
*H04L 12/18* (2006.01)
*H04L 12/58* (2006.01)

(56) References Cited

U.S. PATENT DOCUMENTS

| | | | |
|---|---|---|---|
| 6,141,406 | A | 10/2000 | Johnson |
| 6,219,538 | B1 | 4/2001 | Kaminsky et al. |
| 6,327,352 | B1 | 12/2001 | Betts et al. |
| 6,530,024 | B1 | 3/2003 | Proctor |
| 7,106,843 | B1 | 9/2006 | Gainsboro et al. |
| 7,119,828 | B1 | 10/2006 | Kizhnerman et al. |
| 7,197,560 | B2 | 3/2007 | Caslin et al. |
| 7,308,090 | B2 | 12/2007 | White et al. |
| 7,319,745 | B1 | 1/2008 | Firestone |
| 7,343,008 | B1 | 3/2008 | Frankel |
| 7,437,463 | B1 * | 10/2008 | Valletutti et al. ............. 709/227 |
| 8,107,402 | B1 | 1/2012 | Everson et al. |
| 8,144,632 | B1 | 3/2012 | Chapweske et al. |
| 2004/0081136 | A1 | 4/2004 | Brown et al. |
| 2004/0141605 | A1 | 7/2004 | Chen et al. |
| 2004/0170265 | A1 | 9/2004 | Benco et al. |
| 2004/0186889 | A1 | 9/2004 | Washburn |
| 2005/0018827 | A1 | 1/2005 | Himmel et al. |
| 2005/0069116 | A1 * | 3/2005 | Murray ................... 379/202.01 |
| 2005/0265537 | A1 | 12/2005 | Verbil et al. |
| 2006/0041756 | A1 | 2/2006 | Ashok et al. |
| 2007/0036314 | A1 | 2/2007 | Kloberdans et al. |
| 2007/0073519 | A1 | 3/2007 | Long |
| 2007/0150583 | A1 | 6/2007 | Asthana et al. |
| 2007/0171898 | A1 | 7/2007 | Salva |
| 2008/0069328 | A1 | 3/2008 | Bostick et al. |
| 2008/0232277 | A1 | 9/2008 | Foo et al. |
| 2009/0307043 | A1 | 12/2009 | Cholewinski |
| 2010/0189244 | A1 | 7/2010 | Sastry |
| 2011/0033034 | A1 | 2/2011 | Mani et al. |
| 2011/0286366 | A1 | 11/2011 | Kizhnerman |

OTHER PUBLICATIONS

Cahill, Michael H., "Detecting Fraud in the Real World".
Jakobsson, Markus, et al., "Delayed Password Disclosure" ACM SIGACT News, Sep. 2007, p. 56-75, vol. 38, No. 3.
Jakobsson, Markus, et al., "Quantifying the Security of Preference-based Authentication" DIM '08, Oct. 31, 2008, p. 61-69, Fairfax, Virginia, USA.
Widder, Alexander, et al., "Identification of Suspicious, Unknown Event Patterns in an Event Cloud" DEBS '07, Jun. 20-22, 2007, Toronto, Canada.
Yee, Ka-Ping, et al., "Passpet: Convenient Password Management and Phishing Protection" Symposium on Usable Privacy and Security (SOUPS) 2006, Jul. 12-14, 2006, p. 32-43, Pittsburgh, PA, USA.
Zhang, Yongguang, et al., "Intrusion Detection Techniques for Mobile Wireless Networks" Wireless Networks 9, 2003, p. 545-556.
Zhang, Zheng, et al., "CycleMeter: Detecting Fraudulent Peers in Internet Cycle Sharing" SC2006, Nov. 2006, Tampa, Florida, USA.
Conserto, "Automated Conference Calling Function".
Department of Veteran Affairs, "Nationwide Teleconferencing System (VANTS) Policy" VHA Directive 99-021, May 11, 2009.
LiveOffice TeleConferencing, Conference Calling: Toll Free Teleconferencing for Conference by LiveOffice Conferencing, http://teleconference.liveoffice.com/conferencehostfaq.asp, printed Feb. 24, 2009.
Spiderphone.com, Spiderphone Conference Calls, http://www.spiderphone.com/About/ServiceDescription.asp, printed Feb. 24, 2009.

* cited by examiner

METHODS TO IMPROVE FRAUD DETECTION ON CONFERENCE CALLING SYSTEMS BASED ON OBSERVATION OF PARTICIPANTS' CALL TIME DURATIONS This patent application is a continuation application of U.S. patent application Ser. No. 12/631,458 filed on Dec. 4, 2009, which is hereby incorporated by reference.

BACKGROUND

The present invention is in the field of methods, systems, and computer program products to improve fraud detection on conference calling systems based on observation of participants' call time durations.

A conference call (also known as a "teleconference" or a "teleconference call") is a telephone call in which the calling party wishes to have more than one called party participate in the audio portion of the call. The conference call may be designed to allow the called party to participate during the call, or the call may be set up so that the called party merely listens into the call and cannot speak. It is often referred to as an ATC (Audio Tele-Conference). In addition to audio, conference calls can include video, multimedia and other communication methods.

Conference calls can be designed so that the calling party calls the other participants and adds them to the call; however, participants are usually able to call into the conference call without assistance from an "operator" of the conference system, by dialing into a special telephone number that connects to a "conference bridge" (a specialized type of equipment that links telephone lines).

Companies commonly use a specialized service provider who maintains the conference bridge, or who provides the phone numbers and PIN codes that participants dial to access the meeting or conference call.

SUMMARY

An embodiment of the invention includes a method for detecting fraud in a conference calling system. One or more time duration thresholds are received for a conference call. In at least one embodiment, an attendee duration threshold (also referred to herein as the "first call duration threshold") is received, which indicates a maximum allowed call duration for an attendee of the conference call. A participants threshold (also referred to herein as the "second call duration threshold") is also received, which indicates a maximum allowed total call duration for all of the attendees of the conference call combined; and, a conference call threshold (also referred to herein as the "third call duration threshold") is received, which indicates a maximum allowed call duration for the conference call.

The conference call is monitored to determine an attendee duration, a participants duration, and/or a conference call duration (also referred to herein as the "first call duration", "second call duration", and "third call duration", respectively). The attendee duration represents the call duration of an attendee of the conference call. The participants duration represents the total call duration of all of the attendees combined; and, the conference call duration represents the call duration of the conference call.

The time duration thresholds are compared to the attendee duration, participants duration, and/or conference call duration. If the respective time duration thresholds exceed the attendee duration, participants duration, and/or conference call duration, the conference call is allowed to continue. However, actions are performed by a processor if the attendee duration, participants duration, and/or conference call duration exceeds the time duration thresholds.

In at least one embodiment, a passcode to enter the conference call is received from an attendee exceeding the attendee duration threshold. User information is received from the person assigned the passcode, wherein the user information includes an employee number, an identification badge number, a home telephone number, a home address, a mobile telephone number, an e-mail address, an office telephone number, an office address, and/or answer(s) to security question(s) entered by the person assigned the passcode. Validation information is obtained from the attendee exceeding the attendee duration threshold; and the validation information is compared to the user information. If the validation information matches the user information, an alert indicating that the time duration threshold has been exceeded is sent to the attendee who exceeded the attendee call duration threshold.

In at least one embodiment, the actions include sending an alert indicating that the time duration threshold has been exceeded to an administrator of the conference calling system, a moderator of the conference call, participants of the conference call, and a security personnel. In another embodiment, the actions further include permitting the administrator to enter the conference call, terminating the conference call, and/or voiding a passcode to the conference call. In another embodiment, the actions include generating and storing a report, where the report includes the time duration thresholds, the attendee duration, the participants duration, the conference call duration, a passcode, and the actions performed.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

Figure 1:
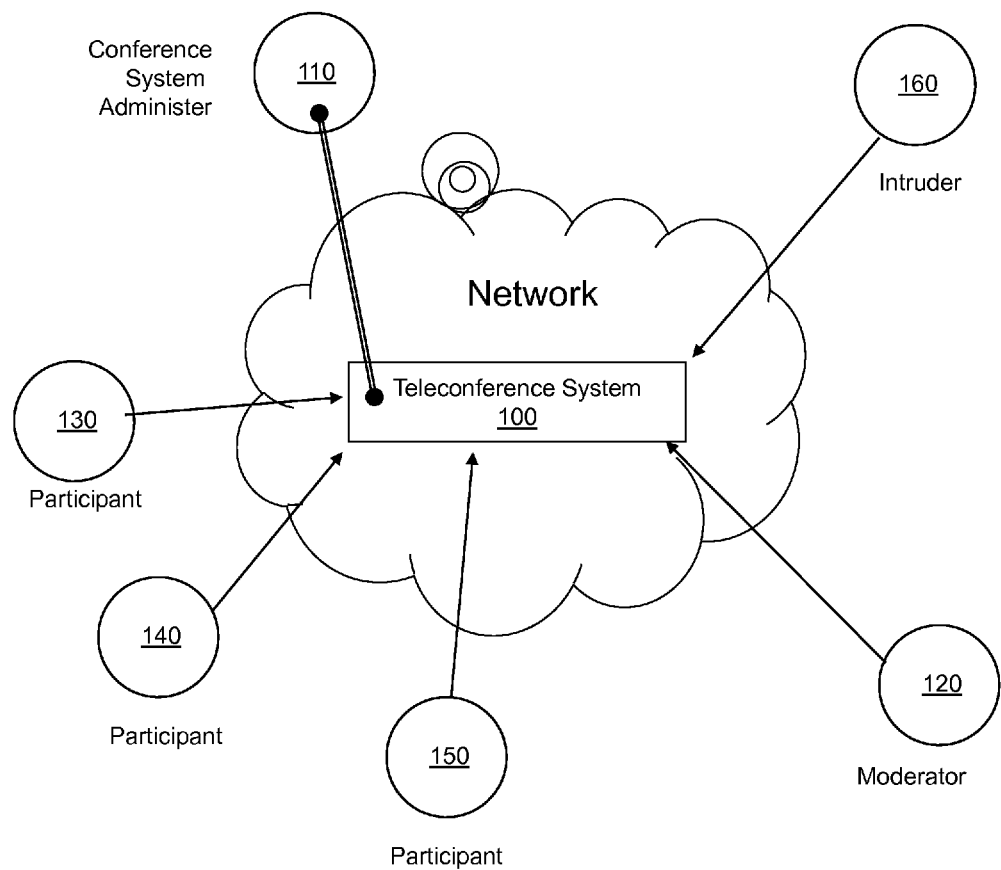
FIG. 1 illustrates a conference calling system according to embodiment of the invention.

FIG. 1 illustrates a conference calling system (also known as a teleconference system) 100 according to embodiment of the invention, wherein a conference system administrator 110, conference moderator 120, participants 130, 140, and 150, and unauthorized intruder 160 are connected to the conference calling system 100. The conference moderator 120, participants 130, 140, and 150, and unauthorized intruder 160 are attendees of the conference calling system 100. In another embodiment, less than or more than three participants are connected to the conference calling system 100.

In order to connect to the conference calling system 100, the participants 130, 140, and 150 use a reservationless bridge. The bridge setup is dynamic, wherein a call-in telephone number and a passcode from the conference moderator 120 are sufficient to begin the conference call. The participants 130, 140, and 150 have the same passcode (i.e., Passcode A), which is different from the passcode of the conference moderator 120 (i.e., Passcode Z). In another embodiment of the invention, the participants 130, 140, and 150 have different passcodes (e.g., Passcodes A, B, and C, respectively). In one embodiment, the intruder 160 has the conference moderator 120's passcode (i.e., Passcode Z). In another embodiment, the intruder 160 utilizes a participant's passcode (i.e., Passcode A, B, or C, depending on how passcodes are assigned) to connect to the conference calling system 100.

The conference system administer 110 configures the conference calling system 100 and assures its operation. These functions are embodied in the service provider of the conference calling system (not shown). However, in one embodiment, these functions are delegated to the purchaser of the conference calling service. In another embodiment, an automatic monitoring system is utilized to configure the conference calling system 100 and assures its operation.

Having the conference moderator 120's passcode, the intruder 160 can either enter a conference call as an attendee during a legitimate meeting; or, the intruder 160 can establish an illegitimate meeting between himself and other intruders. In the fraud scenario illustrated in FIG. 1, the conference call was already in-process when the conference moderator 120 connected to the conference calling system 100. Without the fraud detection methodologies and systems herein, the conference calling system 100 does not inform the conference moderator 120 that another individual had previously started the conference call. Thus, the conference moderator 120 is not aware of the fraud by the intruder 160.

In one example of fraud, the intruder 160 connects to the conference calling system and waits until a conference call begins. This allows the intruder 160 to obtain information during the conference call. The intruder 160 is also allowed to use the conference calling system for other purposes after the moderator 120 and participants 130-150 disconnect from the conference calling system, for example, holding another conference call by sharing the moderator passcode with others. As described in more detail below, an embodiment of the invention includes a method to protect conference calling systems from fraudulent usage by detecting excessive duration of a conference call, excessive duration of an individual attendee, and/or excessive total duration (i.e., connection time) of all participants combined.

Figure 2:
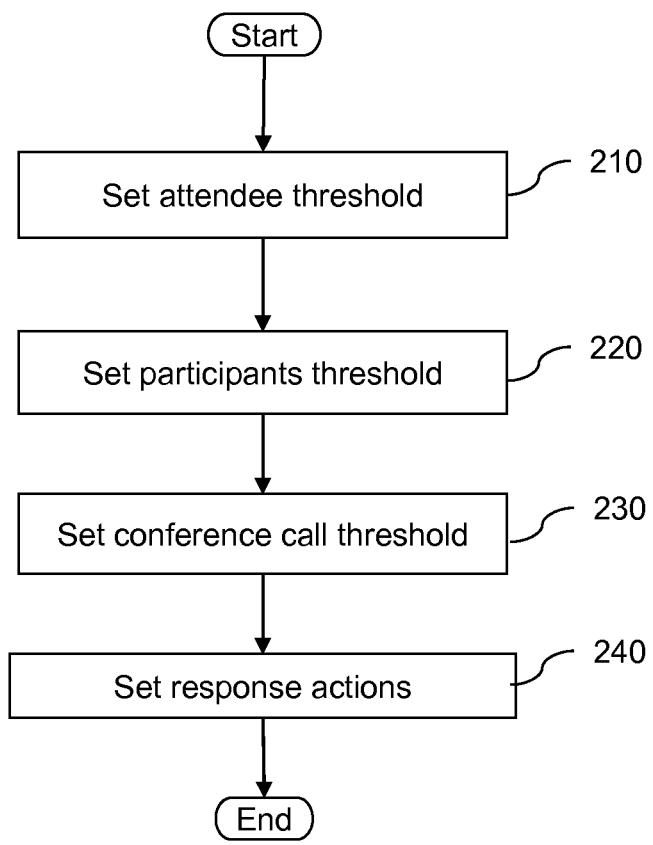
FIG. 2 is a flow diagram illustrating a preparation phase according to an embodiment of the invention.

FIG. 2 is a flow diagram illustrating a preparation phase according to an embodiment of the invention. Pre-configuration in the preparation phase is performed by the conference system administer and/or the moderator prior to initiation of a conference call. Pre-configuration is performed by calling the conference calling system and selecting from multiple options that match the moderator's usage pattern. In an alternative embodiment, pre-configuration of parameters is performed via a web site.

During the preparation phase, a threshold for the maximum time duration allowed for an individual attendee (referred to herein as the "first threshold" or "attendee duration threshold") is set (210). This time duration begins when the attendee (i.e., moderator or participant) logs into the conference calling system using his or her password, and ends when the attendee disconnects from the conference call. For example, if the attendee threshold is set at 60 minutes, and the moderator has been logged into the conference calling system for 70 minutes, then the attendee threshold has been exceeded.

A threshold for the maximum time duration allowed for all of the participants (referred to herein as the "second threshold" or "participants threshold") is also set (220). This time duration combines the amount of time that all of the participants are connected to the conference calling system. For example, if the participants threshold is set at 90 minutes, participant A is connected to the conference calling system for 30 minutes, participant B is connected to the conference calling system for 28 minutes, participant C is connected to the conference calling system for 31 minutes, and there are only 3 participants connected to the conference calling system, then the total combined time of the participants is 89 minutes and the participants threshold is not exceeded.

A threshold for the maximum time duration allowed for the conference call to take place (referred to herein as the "third threshold" or "conference call threshold") is also set (230). This time duration begins when the first attendee is connected to the conference calling system, and ends when the last attendee disconnects from the conference calling system. For example, if the conference call threshold is set for 120 minutes, the first attendee connects to the conference calling system at 11:58 a.m., and the last attendee disconnects from the conference calling system at 1:30 p.m., then the conference call threshold is not exceeded. In an alternative embodiment, this time duration begins at the time the conference call was scheduled to begin (e.g., 12:01 p.m.).

In another alternative embodiment, one or more of the thresholds are omitted and/or an additional threshold is defined in the preparation phase. For example, in at least one embodiment, a threshold for the maximum time duration allowed for one particular attendee (e.g., the participant entered passcode C) is set. In at least one embodiment, the moderator and/or conference system administrator is able to adjust the first, second and/or third thresholds during the conference call in order to allow for additional time to conduct the conference call.

Response actions (e.g., notify conference system administrator) are also set up during the preparation phase (240). The conference calling system will perform the response actions if either the attendee threshold, participants threshold, and/or conference call threshold has been exceeded, as more fully described below with reference to FIGS. 3-4.

Figure 3:
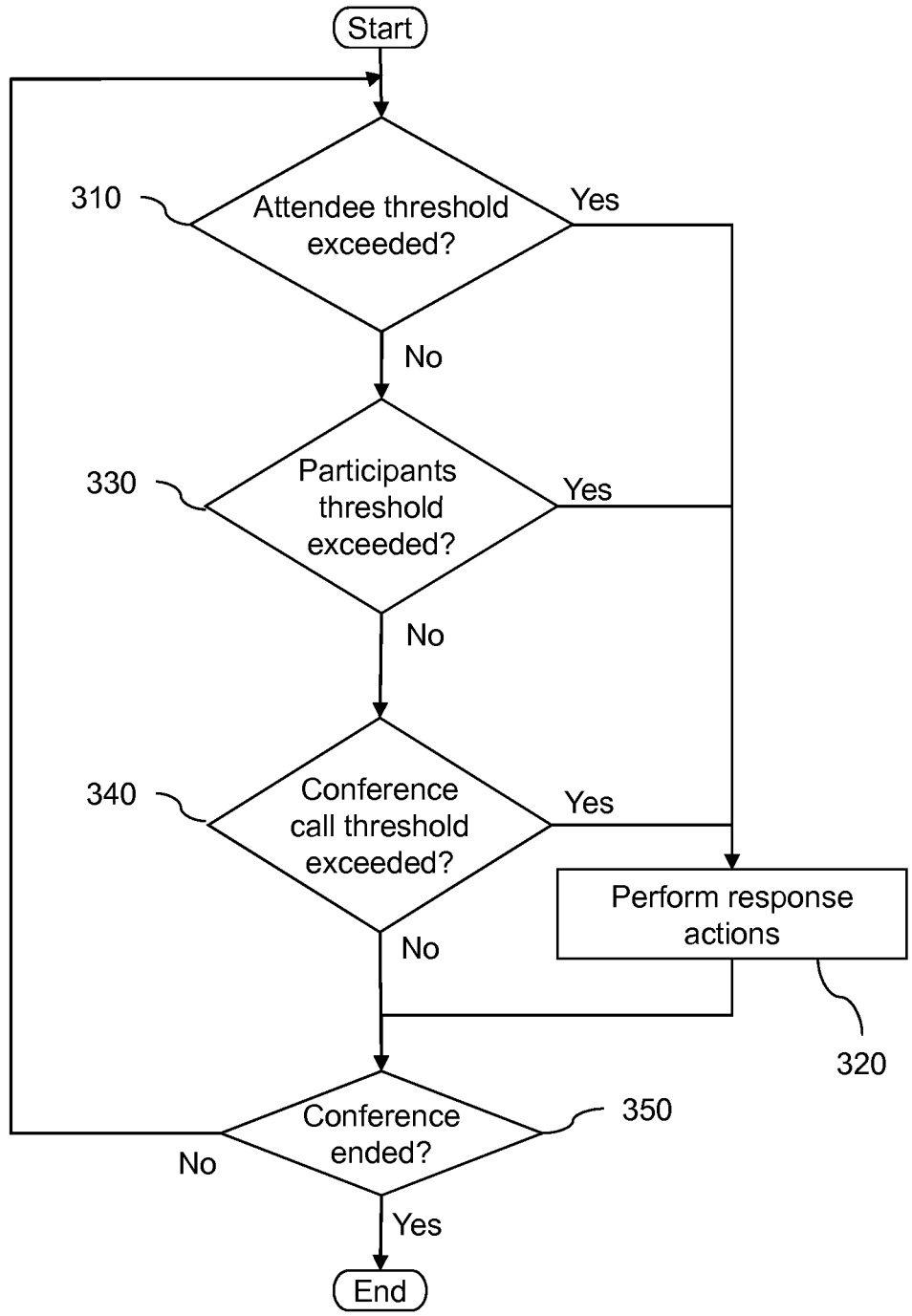
FIG. 3 is a flow diagram illustrating a method to improve fraud detection on conference calling systems based on observation of participants' call time durations according to an embodiment of the invention.

FIG. 3 is a flow diagram illustrating a method to improve fraud detection on conference calling systems based on observation of participants' call time durations according to an embodiment of the invention. More specifically, the conference calling system determines whether the attendee duration threshold has been exceeded (310). If the attendee duration threshold has been exceeded, the method performs response actions (320). For example, the conference calling system sends an alert to the conference system administrator if the attendee threshold is set for 120 minutes and the moderator has been logged into the conference calling system for 125 minutes.

Furthermore, the conference calling system determines whether the participants threshold has been exceeded (330). If the participants threshold has been exceeded, the method performs response actions. For example, the conference calling system sends an alert to the moderator if the participants threshold is set for 60 minutes and a participant has been logged into the conference calling system for 75 minutes.

Additionally, the conference calling system determines whether the conference call threshold has been exceeded (340). If the conference call threshold has been exceeded, the method performs response actions. For example, the conference calling system terminates the conference call if the conference call threshold is set for 120 minutes and it has been over 120 minutes since the first attendee logged into the conference calling system.

In an alternative embodiment, the method determines whether the thresholds are exceeded in a different order, e.g., the method determines whether the conference call threshold has been exceeded prior to determining whether the participants threshold has been exceeded. In another alternative embodiment, the method monitors whether the thresholds have been exceeded simultaneously. In yet another alternative embodiment, one or more of the thresholds are omitted and/or the method includes an additional threshold.

The method continues to monitor whether any of the thresholds are exceeded until all of the thresholds have been exceeded or until the last attendee disconnects from the conference calling system (i.e., the conference call is ended (350)). In at least one embodiment of the invention, the method determines whether the thresholds have been exceeded in pre-defined intervals set during the preparation phase. For example, the method determines whether the thresholds have been exceeded every 5 minutes. In another embodiment, the method continually monitors the time durations of the attendees and the total conference call duration, such that response actions are performed immediately after a threshold is exceeded.

Figure 4:
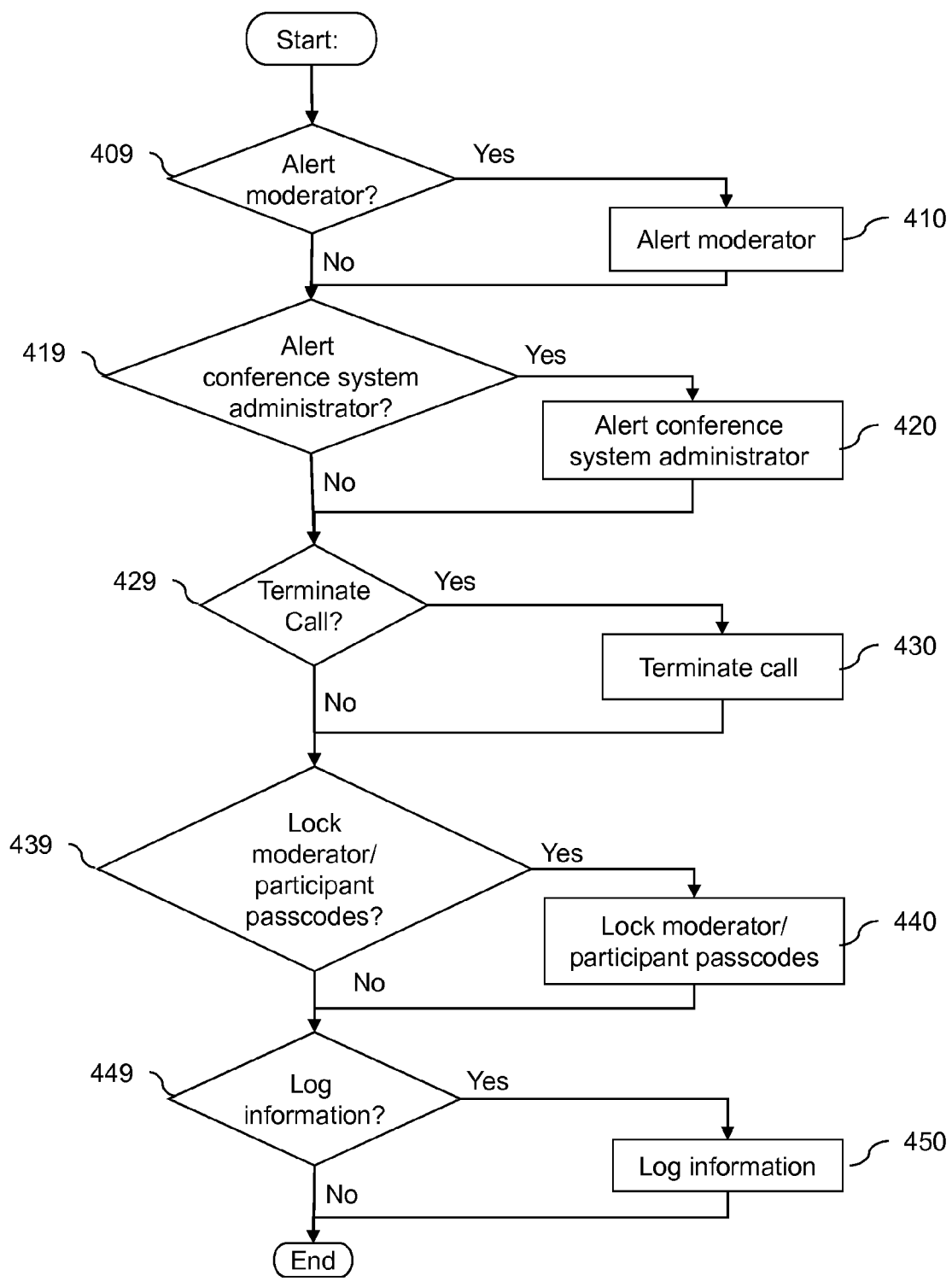
FIG. 4 is a flow diagram illustrating a method for performing response actions according to an embodiment of the invention.

FIG. 4 is a flow diagram illustrating a method for performing response actions according to an embodiment of the invention. In alternative embodiments, one or more of the response actions illustrated in FIG. 4 are omitted, dependent on the configuration as determined in the preparation phase. As described below, in at least one embodiment, the response actions illustrated in FIG. 4 are performed by a processor connected to a database and an electronic timer.

The processor determines whether to alert the moderator (409). The "true moderator" is the actual person that has been assigned the moderator passcode by the conference calling system or the conference system administrator. The true moderator is alerted if that person is known by the conference calling system; or, if the true moderator is not known by the conference calling system, all of the moderators that have entered the moderator passcode are alerted by the processor, i.e., the true moderator and the intruder if masquerading as a moderator (410). The alert includes a notification that a threshold defined in the preparation phase has been exceeded (e.g., the allowed duration for the conference call has been exceeded). In at least one embodiment of the invention, the alert also includes the thresholds defined in the preparation phase, the amount of time each attendee has been logged into the conference calling system, and the duration of the conference call. In at least one embodiment, the alerts include a time stamped e-mail, text message, instant message, facsimile, and/or other form of communication indicating that a threshold has been exceeded.

The processor determines whether to send an alert to the conference system administrator (419). If the conference system administrator is alerted by the processor (420), further actions are automatically or manually performed by the conference system administrator. In at least one embodiment of the invention, such actions are setup prior to initiation of the conference call (e.g., during the preparation phase). Furthermore, the processor determines whether to terminate the conference call (429). If the conference call is terminated by the processor (430), attendees of the conference call are notified that a threshold has been exceeded.

The processor determines whether to lock one or more of the passcodes of the attendees in order to prevent future access to the conference calling system (439). If a passcode is locked by the processor (440), one or more of the attendees are notified that a passcode has been locked. Based on the response actions defined in the preparation phase, the passcode is either temporarily or permanently locked. For example, in one embodiment of the invention, Participant C is notified that his passcode has been permanently locked; and, he is given contact information for the conference system administrator in order to obtain a new passcode.

In addition, the processor determines whether to log information for future reference and reporting into, for example, a report database (449). The processor logs information (450) by saving a report of the occurrence, wherein the report includes, for example, at least one of the thresholds defined in the preparation phase, the duration of the conference call, the amount of time each attendee has been logged into the conference calling system, the passcodes of each attendee, the telephone numbers of the attendees that called into the conference calling system (obtained from a caller-identification system), the time and date that the threshold(s) were exceeded, and a detailed description of the response action(s) taken, e.g., identification of personnel who received alerts from the conference calling system. Information in the report is utilized to identify trends, track moderator ID and/or passcode usage, and/or for detailed review by the conference system administrator and/or personnel within the true moderator's company. For example, in at least one embodiment, the conference system administrator compares reports that have been collected over time in order to identify trends, such as a particular passcode that repeatedly violates a threshold and/or a particular time of day that a threshold is frequently violated.

In an alternative embodiment, the response actions illustrated in FIG. 4 are performed in another order, e.g., the conference system administer is alerted prior to alerting the moderator. In another alternative embodiment, the processor also performs other actions as determined by users of the conference calling system. For example, in at least one embodiment of the invention, the processor requests additional identification and/or credentials from one or more of the attendees. The identification includes the attendee's corporate employee number and/or ID badge number. The credentials may include, for example, at least one of the attendee's home telephone number, home address, mobile telephone number, e-mail address, office telephone number, office address, and secret question(s) entered when the attendee was assigned the passcode(s) (e.g, pet's name, date of birth, mother's maiden name). The conference calling system determines whether the information entered by the attendee (referred to herein as "second information" or "validation information") matches actual attendee identification and/or credentials (referred to herein as "first information" or "user information") obtained during the preparation phase. In at least one embodiment, the user information is input into an electronic database by the system administrator, moderator, and/or another employee of the user's company, wherein the user information is subsequently retrieved from the database for validation purposes. In another embodiment, the conference calling system automatically captures an audio recording of the conference call when a threshold is exceeded.

In another embodiment of the invention, the processor also determines whether to alert others (in addition to or alternatively to the person assigned the passcode and/or the moderator). Alerting others includes sending an alert indicating that a threshold has been exceeded to at least one of administrative personnel of the conference calling system provider and security personnel employed by the true moderator's company who is responsible for tracking risks and investigating fraud across the company.

Figure 5:
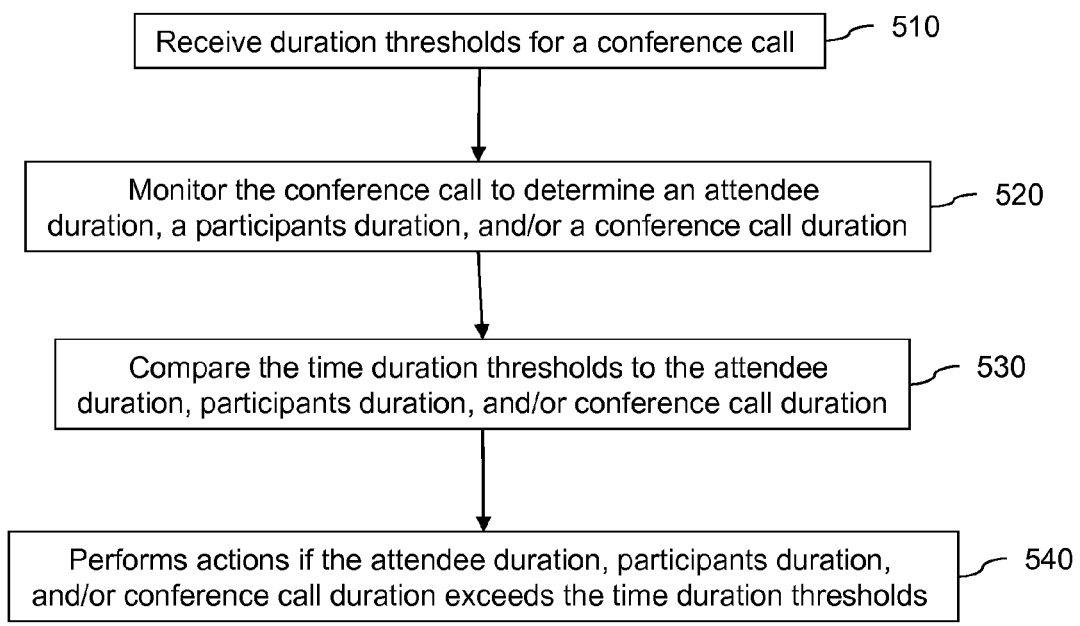
FIG. 5 is a flow diagram illustrating a method for detecting fraudulent use of a passcode in a conference calling system according to an embodiment of the invention.
Figure 6:
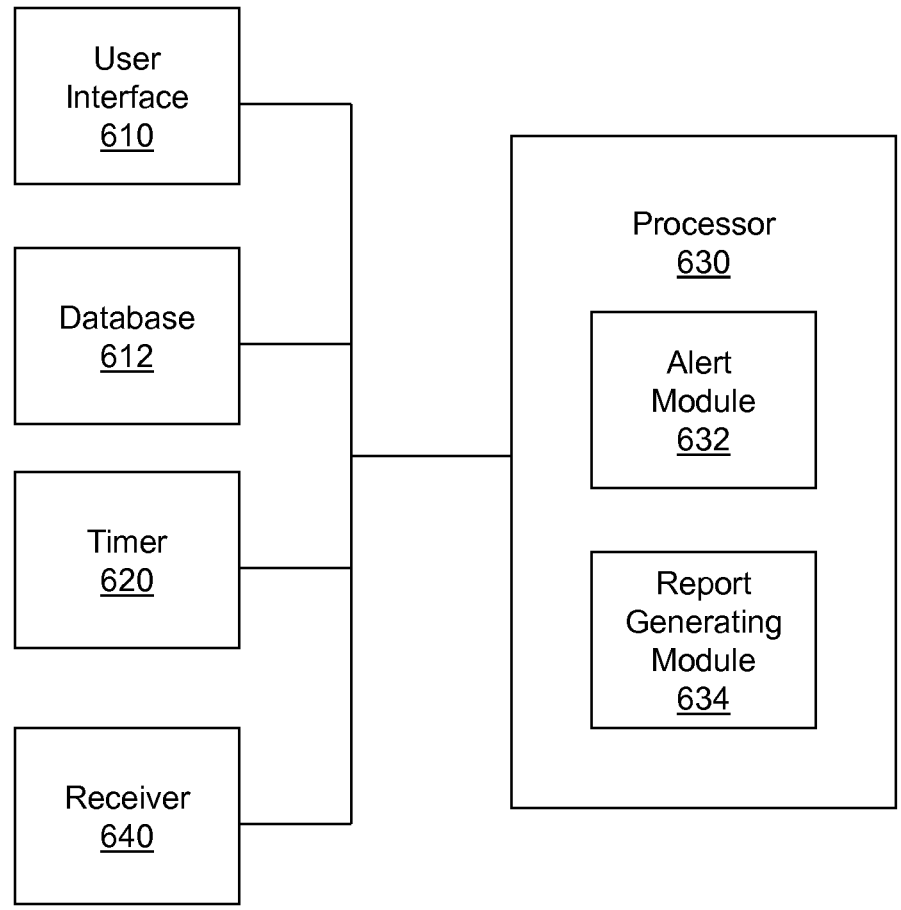
FIG. 6 illustrates a system for detecting fraudulent use of a passcode in a conference calling system according to an embodiment of the invention.

FIG. 5 is a flow diagram illustrating a method for detecting fraudulent use in a conference calling system according to an embodiment of the invention. One or more time duration thresholds are received for a conference call (510). In at least one embodiment, a user interface 610 (See FIG. 6) receives an attendee duration threshold (also referred to herein as the "first call duration threshold"), which indicates a maximum allowed call duration for an attendee of the conference call. A participants threshold (also referred to herein as the "second call duration threshold") is also received, which indicates a maximum allowed total call duration for all of the attendees of the conference call combined; and, a conference call threshold (also referred to herein as the "third call duration threshold") is received, which indicates a maximum allowed call duration for the conference call. In at least one embodiment, pre-configuration of the time duration thresholds are set up in a preparation phase by the conference system administer and/or the moderator prior to initiation of a conference call. Pre-configuration is performed by calling the conference calling system and selecting from multiple options that match the moderator's usage pattern. In another embodiment, pre-configuration of parameters is performed via a web site. The time duration thresholds are stored in a database 612.

An electronic timer 620 monitors the conference call to determine an attendee duration, a participants duration, and/or a conference call duration (also referred to herein as the "first call duration", "second call duration", and "third call duration", respectively) (520). In at least one embodiment, the timer 620 includes at least a first timer, a second timer, a third timer, and a fourth timer. The attendee duration represents the call duration of an attendee of the conference call. In at least one embodiment, the attendee duration is determined by activating the first timer of the timer 630 when the attendee (i.e., moderator or participant) enters the conference call system using his or her passcode, and stopping the first timer when the attendee disconnects from the conference call.

The participants duration represents the total call duration of all of the attendees combined. For example, in at least one embodiment, the first timer times the call duration of a moderator (attendee A); the second timer times the call duration of a first participant (attendee B); and, the third timer times the call duration of a second participant (attendee C). If attendee A is connected to the conference call for 30 minutes, attendee B is connected to the conference call for 28 minutes, attendee C is connected to the conference call for 31 minutes, and there are only 3 attendees connected to the conference call, then the total combined time of the attendees is 89 minutes. The total combined time of the attendees is determined by the timer 620 and/or a processor 630 connected to the timer 620.

The conference call duration represents the call duration of the conference call. In at least one embodiment, the conference call duration is determined by activating the fourth timer of the timer 620 when the first attendee to join the conference call is connected to the conference call, and stopping the fourth timer when the last attendee to exit the conference call disconnects from the conference call. The electronic timer 620 continues to monitor whether any of the thresholds are exceeded until all of the thresholds have been exceeded or until the last attendee disconnects from the conference calling system (i.e., the conference call is ended The processor 630 compares the time duration thresholds to the attendee duration, participants duration, and/or conference call duration (530). If the time duration thresholds exceed the attendee duration, participants duration, and/or conference call duration, the conference call is allowed to continue. However, actions (also referred to herein as "response actions") are performed by the processor 630 if the attendee duration, participants duration, and/or conference call duration exceeds the time duration thresholds (540).

In at least one embodiment, if an attendee violates the attendee duration threshold, a receiver 640 obtains the passcode entered by that attendee. User information (also referred to herein as "first information") is received from the person assigned the passcode, wherein the user information includes an employee number, an identification badge number, a home telephone number, a home address, a mobile telephone number, an e-mail address, an office telephone number, an office address, and/or answer(s) to security question(s) entered by the person assigned the passcode. Validation information (also referred to herein as "second information") is obtained from the attendee exceeding the attendee duration threshold; and the validation information is compared to the user information. If the validation information matches the user information, an alert is sent to the attendee who exceeded the attendee call duration threshold from an alert module 632 in the processor 630. In at least one embodiment, the alert includes a time stamped e-mail, text message, instant message, facsimile, and/or other form of communication indicating that the time duration threshold has been exceeded.

In at least one embodiment, the actions further include sending the alert to an administrator of the conference calling system, a moderator of the conference call, participants of the conference call, and/or security personnel of the teleconference provider and/or at least one company employing a participant of the teleconference call. In another embodiment, the actions further include permitting the administrator to enter the conference call, terminating the conference call, and/or voiding a passcode to the conference call. For example, in at least one embodiment, a passcode is voided or temporarily disabled after 5 unsuccessful attempts to access the conference calling system in a 24 hour period.

In another embodiment, a report generating module 634 in the processor 630 generates and stores a report (e.g., in an electronic database), where the report includes the time duration thresholds, the attendee duration, the participants duration, the conference call duration, a passcode, and the actions performed. In yet another embodiment, the alert module 632 and report generating module 634 are outside of the processor 630. Information in the report is utilized to identify trends, track moderator ID and/or passcode usage, and/or for detailed review by the conference system administrator and/or personnel within the true moderator's company. For example, in at least one embodiment, the conference system administrator compares reports that have been collected over time in order to identify trends, such as a particular passcode that repeatedly violates a threshold and/or a particular time of day that a threshold is frequently violated.

Accordingly, an embodiment of the invention includes systems and methodologies to investigate potential fraudulent activity on conference calling systems. The occurrence of a potential fraudulent condition is identified, such that rapid response actions may be taken. The embodiments of the invention can save thousands of dollars in fraudulent toll charges. Moreover, the ability to identify fraudulent activity can prevent the loss of information.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
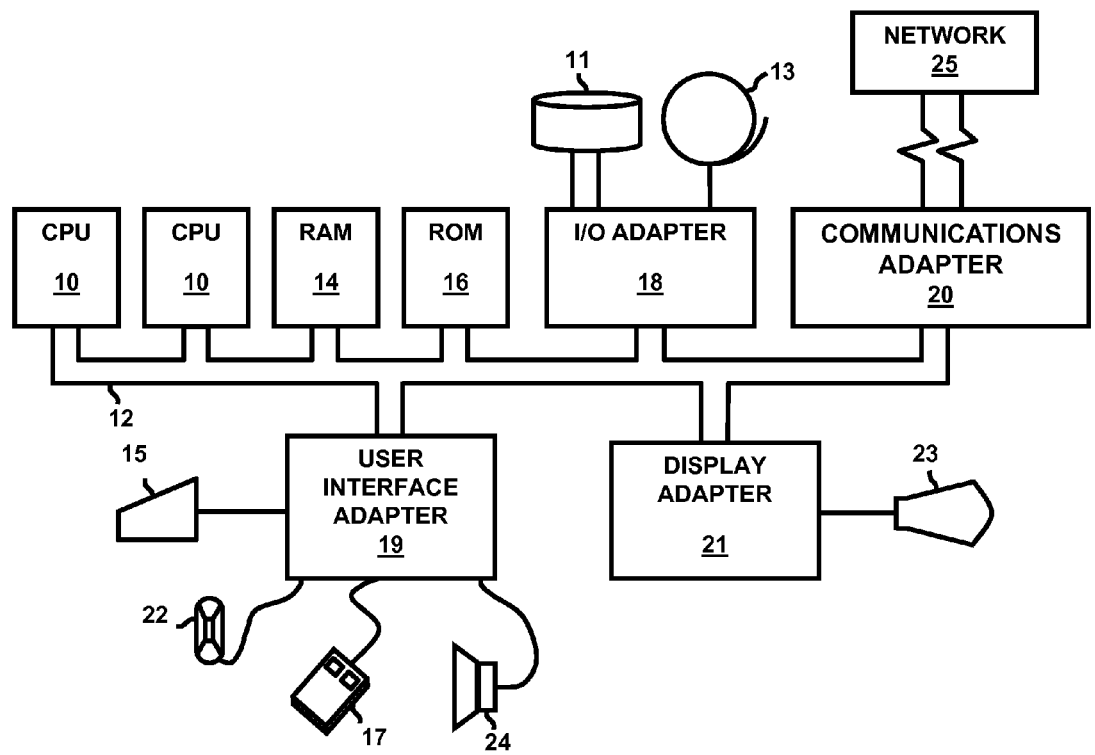
FIG. 7 illustrates a computer program product according to an embodiment of the invention.

Referring now to FIG. 7, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for detecting fraudulent use in a conference calling system, the method including:
   receiving at least one time duration threshold for a conference call of the conference calling system;
   monitoring the conference call to determine at least one of a first call duration, a second call duration, and a third call duration,
      the first call duration including a call duration of at least one attendee of the conference call,
      the second call duration including a total call duration of all of the attendees of the conference call combined, and
      the third call duration including a call duration for the conference call;
   comparing the time duration threshold to at least one of the first call duration, the second call duration, and the third call duration with a processor;
   performing actions with the processor if at least one of the first call duration, the second call duration, and the third call duration exceeds the time duration threshold; and
   permitting the conference call to continue if the time duration threshold exceeds the first call duration, the second call duration, and the third call duration, when said comparing of the time duration threshold includes comparing the time duration threshold to the first call duration, the second call duration, and the third call duration.

2. The method according to claim 1, wherein the at least one time duration threshold includes a first call duration threshold, a second call duration threshold, and a third call duration threshold,
   the first call duration threshold including a maximum allowed call duration for the at least one attendee of the conference call,
   the second call duration threshold including a maximum allowed total call duration for all of the attendees of the conference call combined, and
   the third call duration threshold including a maximum allowed call duration for the conference call.

3. The method according to claim 2, further including:
   receiving a passcode to enter the conference call from an attendee exceeding the first call duration threshold;
   obtaining first information from a person assigned the passcode;
   obtaining second information from the attendee exceeding the first call duration threshold;
   determining whether the first information matches the second information; and
   sending an alert to the attendee exceeding the first call duration threshold if the first information matches the second information.

4. The method according to claim 3, wherein the performing of the actions includes, sending an alert to the at least one attendee exceeding the first call duration threshold if the first information matches the second information, the alert indicating that the time duration threshold has been exceeded.

5. The method according to claim 3, wherein the first information includes at least one of an employee number, an identification badge number, a home telephone number, a home address, a mobile telephone number, an e-mail address, an office telephone number, an office address, and at least one answer to at least one security question entered by the person assigned the passcode.

6. The method according to claim 1, wherein the performing of the actions includes sending an alert to at least one of an administrator of the conference calling system, a moderator of the conference call, participants of the conference call, and at least one security personnel, the alert indicating that the time duration threshold has been exceeded.

7. The method according to claim 1, wherein the performing of the actions includes at least one of permitting an administrator of the conference calling system to enter the conference call, terminating the conference call, and voiding at least one passcode to the conference call.

8. The method according to claim 1, wherein the performing of the actions includes generating and storing a report, where the report includes at least one of the time duration threshold, the first call duration, the second call duration, the third call duration, at least one passcode to the conference call, and the actions performed.

9. A method for detecting fraudulent use in a conference calling system, the method including:
   receiving at least one time duration threshold for a conference call of the conference calling system with a user interface;
   monitoring the conference call with a timer to determine at least one of a first call duration, a second call duration, and a third call duration,
      the first call duration including a call duration of at least one attendee of the conference call,
      the second call duration including a total call duration of all of the attendees of the conference call combined, and the third call duration including a call duration for the conference call;
comparing the time duration threshold to at least one of the first call duration, the second call duration, and the third call duration with a processor;
performing at least one of validation actions and alert actions with the processor if at least one of the first call duration, the second call duration, and the third call duration exceeds the time duration threshold, the validation actions and alert actions including at least one of:
permitting an administrator of the conference calling system to enter the conference call,
terminating the conference call,
voiding at least one passcode to the conference call, and
sending an alert to at least one of the administrator of the conference calling system, a moderator of the conference call, participants of the conference call, and at least one security personnel, the alert indicating that the time duration threshold has been exceeded; and
permitting the conference call to continue if the time duration threshold exceeds the first call duration, the second call duration, and the third call duration, when said comparing of the time duration threshold includes comparing the time duration threshold to the first call duration, the second call duration, and the third call duration.

10. The method according to claim 9, wherein the at least one time duration threshold includes a first call duration threshold, a second call duration threshold, and a third call duration threshold,
the first call duration threshold including a maximum allowed call duration for the at least one attendee of the conference call,
the second call duration threshold including a maximum allowed total call duration for all of the attendees of the conference call combined, and
the third call duration threshold including a maximum allowed call duration for the conference call.

11. The method according to claim 10, further including:
receiving a passcode to enter the conference call from an attendee exceeding the first call duration threshold;
obtaining first information from a person assigned the passcode;
obtaining second information from the attendee exceeding the first call duration threshold; and
determining whether the first information matches the second information.

12. The method according to claim 11, wherein the performing of the at least one of validation actions and alert actions includes, sending an alert to the at least one attendee exceeding the first call duration threshold if the first information matches the second information, the alert indicating that the time duration threshold has been exceeded.

13. The method according to claim 11, wherein the first information includes at least one of an employee number, an identification badge number, a telephone number, a home address, an e-mail address, an office address, and at least one answer to at least one security question entered by the person assigned the passcode.

14. The method according to claim 9, wherein the performing of the at least one of validation actions and alert actions includes generating and storing a report, where the report includes at least one of the time duration threshold, the first call duration, the second call duration, the third call duration, at least one passcode to the conference call, the validation actions performed, and the alert actions performed.

15. A system for detecting fraudulent use in a conference calling system, the system including:
a user interface for receiving at least one time duration threshold for a conference call of the conference calling system;
a database for storing the at least one time duration threshold;
a timer for monitoring the conference call to determine a first call duration, a second call duration, and a third call duration,
the first call duration including a call duration of at least one attendee of the conference call,
the second call duration including a total call duration of all of the attendees of the conference call combined, and
the third call duration including a call duration for the conference call;
a processor operatively connected to the database and the timer,
the processor compares the time duration threshold to at least one of the first call duration, the second call duration, and the third call duration, and
the processor performs actions if at least one of the first call duration, the second call duration, and the third call duration exceeds the time duration threshold; and
an alert module in the processor, the alert module sends an alert to an administrator of the conference calling system, a moderator of the conference call, participants of the conference call, and at least one security personnel, the alert indicating that the time duration threshold has been exceeded.

16. The system according to claim 15, wherein the at least one time duration threshold includes a first call duration threshold, a second call duration threshold, and a third call duration threshold,
the first call duration threshold including a maximum allowed call duration for the at least one attendee of the conference call,
the second call duration threshold including a maximum allowed total call duration for all of the attendees of the conference call combined, and
the third call duration threshold including a maximum allowed call duration for the conference call.

17. The system according to claim 16, further including a receiver for receiving a passcode to enter the conference call from an attendee exceeding the first call duration threshold, wherein the user interface obtains first information from a person assigned the passcode, wherein the receiver receives second information from the attendee exceeding the first call duration threshold, and wherein the processor determines whether the first information matches the second information.

18. The system according to claim 17, wherein the processor includes an alert module, the alert module sends an alert to the at least one attendee exceeding the first call duration threshold if the first information matches the second information, the alert indicating that the time duration threshold has been exceeded.

19. The system according to claim 17, wherein the first information includes at least one of an employee number, an identification badge number, a home telephone number, a home address, a mobile telephone number, an e-mail address, an office telephone number, an office address, and an answer to a security question entered by the person assigned the passcode.

20. The system according to claim 15, wherein the processor permits an administrator of the conference calling system to enter the conference call, terminates the conference call, and voids at least one passcode to the conference call.

21. The system according to claim 15, further including a report generating module for generating and storing a report, where the report includes the time duration threshold, the first call duration, the second call duration, the third call duration, at least one passcode to the conference call, and the actions performed.

22. A computer program product for detecting fraudulent use in a conference calling system, the computer program product including:
 a computer readable storage medium;
 first program instructions to receive at least one time duration threshold for a conference call of the conference calling system;
 second program instructions to monitor the conference call to determine at least one of a first call duration, a second call duration, and a third call duration,
  the first call duration including a call duration of at least one attendee of the conference call,
  the second call duration including a total call duration of all of the attendees of the conference call combined, and
  the third call duration including a call duration for the conference call;
 third program instructions to compare the time duration threshold to at least one of the first call duration, the second call duration, and the third call duration;
 fourth program instructions to perform actions with the processor if at least one of the first call duration, the second call duration, and the third call duration exceeds the time duration threshold, and
 fifth program instructions to permit the conference call to continue if the time duration threshold exceeds the first call duration, the second call duration, and the third call duration, when said comparing of the time duration threshold includes comparing the time duration threshold to the first call duration, the second call duration, and the third call duration,
 wherein the first program instructions, the second program instructions, the third program instructions, the fourth program instructions, and the fifth program instructions are stored on the computer readable storage medium.

* * * * *